Patented July 17, 1934

1,967,074

UNITED STATES PATENT OFFICE 1,967,074

PROCESS OF TREATING FRESH FRUIT

John C. Baker, Montclair, N. J.

No Drawing. Application October 14, 1931,
Serial No. 568,873

7 Claims. (Cl. 99—1)

This invention relates to processes of treating fresh fruit to prevent decay. In the commercial production, storage and marketing of fruit or the like, great losses are caused by decay produced by moulds or other similar organisms. Such organisms enter usually through injuries to the skin of the fruit. Numerous methods of sterilizing the fruit, or at least inhibiting the growth of such organisms, have been resorted to with more or less success. Hypochlorite or borax solutions, sulphur dioxide and alkaline treatments have all been used for this purpose.

Solutions have the disadvantage that they wet mould spores or the like with difficulty, and unless wetting occurs the treating reagent cannot act.

Further, several, if not all, prior reagents are specific in their action and do not destroy all types of decay producing organisms indiscriminately. For example, borax is effective against green mould, but has little action in the case of blue mould or black stem rot. This is especially serious since blue mould rapidly spreads throughout an entire shipment.

I have discovered that sterilization or inhibition of growth of organisms on fruits can be obtained by the use of nitrogen trichloride in the form of vapor highly diluted with a relatively inert gas, such as air.

A mixture of air and nitrogen trichloride, when applied to the fruit in definite concentrations and for a suitable length of time, produces results which are superior to those obtained by other methods or other reagents. As the reagent is in gaseous or vapor form, it will readily penetrate and act upon the spores, moulds, and other organisms in the injured and on the other parts of the skin of the fruit. Further, the reagent nitrogen trichloride is effective in killing not only all kinds of moulds, but also their spores. This is particularly true in the case of citrus fruits. The gaseous mixture when applied in the proper concentration to citrus fruits does not injure the skin or exterior surface of the fruit, but destroys any organisms included in those spots where injuries have occurred and thereby improves the keeping quality of the fruit.

Numerous methods of applying the gas to the fruit can be utilized. The most effective method, so far as completeness of sterilization is concerned, is that in which the fruit is in motion or is turned during the period of exposure so that all portions of the fruit are exposed to the gas. This can be readily accomplished by passing the fruit through a long tube with a counter current of the gas in the other direction. This method of application of the sterilizing gas entails some additional operations over the present methods of handling the fruit, so that it is much more convenient to expose the fruit either in the containers in which it is collected and delivered to the packing plant, or in the finished package ready for shipment.

The treatment of the fruit after it has been wrapped in paper or wrapped and packed in boxes or crates has the advantage that the paper wrapping prevents the re-inoculation of injuries by mould spores after the sterilization treatment. The paper is sufficiently pervious to the treating gas to make the sterilizing treatment effective but is substantially impervious to mould spores or other decay producing organisms. The sterilization after wrapping or after wrapping and packing also eliminates the possibility of the skin or fruit being injured and such injured parts becoming inoculated with mould spores or the like, intermediate the time at which sterilization treatment is given and the time that the fruit is packed in crates ready for shipment.

This is of importance in view of the fact that the treatment with nitrogen trichloride does not give complete immunity against subsequent inoculation. There is some immunity, however, as tests have shown that the treatment renders the injured portions of the skin much less readily susceptible to subsequent inoculation than portions injured after such treatment.

While the gaseous nitrogen trichloride has difficulty in reaching the parts of the fruit pressed against each other or the walls of the crate, it is also difficult, for the same reasons, for air to reach such parts, and without air moulds have difficulty in growing. Hence, the incompleteness of sterilization is not as serious as might be expected.

The fruit may be treated with wax or the like to restrict shrinkage by evaporation of water before treatment with nitrogen trichloride without destroying the effectiveness of such treatment.

Gaseous sterilizing agents are very effective at the time of application—more so than solutions of solid substances like borax. However, being gaseous, their effects are more temporary than solutions which, on evaporation of the solvent, leave behind the growth inhibiting or destroying solids dissolved therein. A double treatment by the two types of reagent is, therefore, highly effective. The fruit may be first treated with a borax or similar solution, then dried, wrapped, and finally subjected to the action of nitrogen trichloride to complete the destruction of organisms accomplished in part by the borax.

One highly satisfactory method by which the invention may be carried into effect is to wrap the fruit, such as oranges, in paper, pack them in standard cases, and then expose the cases to air carrying about 0.05 gram of nitrogen trichloride per cubic foot for about one hour at ordinary room temperature. Similar results may be obtained by exposing the oranges to a lower concentration for a longer time, or to a higher concentration for a shorter time. Usually, however, the concentration of nitrogen trichloride will be between 0.01 and 0.5 gram per cubic foot of air. Also, the conditions of treatment may somewhat depend upon the temperature, low temperatures requiring either higher concentrations or slightly longer time. The effectiveness of this method of treating oranges has been demonstrated by purposely injuring the fruit and inoculating it with the ordinary organisms which appear in mould, treating a portion of the inoculated fruit with air carrying nitrogen trichloride, and comparing the keeping quality of the treated and untreated portions. It was found that when the untreated portion had deteriorated to the extent that every fruit exhibited mould decay, in the treated portion somewhere between 80% and 90% of the fruit was still good. In the above demonstration the fruit was wrapped and crated so that the gas did not have equal opportunity to reach all parts of the skin of the fruit. In other demonstrations, where the fruit was treated in a tube or other means adapted to keep the fruit in motion during treatment a still higher percentage was found to be in good condition.

There are numerous methods of making nitrogen trichloride. The simplest method is the one disclosed in my Patent No. 1,510,132. Other methods of making nitrogen trichloride are disclosed in my Patent No. 1,367,530. The gas as produced in these methods is suitable for use in my present process of sterilization, even though it may contain small amounts of chlorine, with the exception that the amount of air with which the gas is diluted should be carefully regulated and known.

It is undesirable to treat citrus fruits with excessive concentrations of the gas for a long time as this tends to injure or destroy the protective surface of the fruit and increase the shrinkage from evaporation. Also, the various citrus fruits differ somewhat in their resistance to the gas. Lemons in general are more sensitive than are oranges and should be treated accordingly.

My method of treatment is not limited to citrus fruits, but is to be applied to any fruit or vegetable which is ordinarily subject to decay and which will not be injured by application of the gas, and the term "fruit" as used in the specification and claims is to be given this broad interpretation.

It will also be understood that the term "sterilization" is not to be interpreted in its strictest scientific sense, but is to be understood as including all treatments which are markedly sterilizing from a practical commmercial point of view. Further, the term "sterilization" is intended to include not merely destruction of life, but also inhibition of the growth and reproduction of mould and other organisms.

What is claimed is:

1. The process of treating fresh fruit to prevent decay, comprising subjecting the fruit to the action of nitrogen trichloride gas highly diluted with a relatively inert gas in a concentration and for a length of time effective to prevent decay but insufficient to injure the protective surface of the fruit.

2. The process of treating fresh fruit to prevent decay, comprising subjecting the fruit to the action of air carrying from 0.01 to 0.5 gram of nitrogen trichloride per cubic foot for a sufficient length of time to prevent decay but insufficient to injure the protective surface of the fruit.

3. The process of treating fresh fruit to prevent decay, comprising wrapping the fruit in paper, and subsequently subjecting the wrapped fruit to the action of a gas containing, in amounts effective to prevent decay but insufficient to injure the protective surface of the fruit, nitrogen trichloride in gaseous form.

4. The process of treating fresh citrus fruit to prevent decay, comprising wrapping the fruit in paper, and subsequently subjecting the wrapped fruit to the action of a gas containing, in amounts effective to prevent decay but insufficient to injure the protective surface of the fruit, nitrogen trichloride in gaseous form.

5. The process of treating fresh fruit to prevent decay, comprising exposing the fruit in transport containers to the action of a gas containing, in amounts effective to prevent decay but insufficient to injure the protective surface of the fruit, nitrogen trichloride in gaseous form.

6. The process of treating fresh fruit to prevent decay, comprising exposing the fruit in the containers in which it is collected and delivered to the packing plant to the action of a gas containing, in amounts effective to prevent decay but insufficient to injure the protective surface of the fruit, nitrogen trichloride in gaseous form.

7. The process of treating fresh fruit to prevent decay, comprising exposing the fruit in the finished package ready for shipment to the action of a gas containing, in amounts effective to prevent decay but insufficient to injure the protective surface of the fruit, nitrogen trichloride in gaseous form.

JOHN C. BAKER.